April 6, 1937.  L. N. DAVIS  2,075,929
HEAT TREATING FURNACE AND METHOD OF HEAT TREATING
Original Filed Aug. 14, 1935  5 Sheets-Sheet 1

INVENTOR
LEWIS NEWELL DAVIS
BY
ATTORNEY.

Patented Apr. 6, 1937

2,075,929

UNITED STATES PATENT OFFICE 2,075,929

HEAT TREATING FURNACE AND METHOD OF HEAT TREATING

Lewis Newell Davis, Santa Monica, Calif., assignor to Douglas Aircraft Company, Inc., Santa Monica, Calif., a corporation of Delaware Continuation of application Serial No. 36,126, August 14, 1935. This application February 3, 1936, Serial No. 62,037

20 Claims. (Cl. 263—52)

My invention relates to the art of heat treating, and relates particularly to a unique heat treating furnace and also to a unique method of raising articles or objects to the desired temperature and maintaining the articles at such temperatures over a period of time without such temperatures varying more than a few degrees. The present application is a continuation of my application for Heat treating furnace, Serial No. 36,126, filed August 14, 1935.

In certain types of heat treatment it is necessary that all portions of the object being heat treated be brought to substantially the same temperature or condition of heat. In many instances this is done by immersing the object in a bath which is maintained at the desired temperature, and also heat treating operations of this general character have been carried on with more or less success in heated air or gas-filled chambers. Both of the foregoing methods have disadvantages which I believe are practically overcome in my present invention. For example, the substances used for heat treating baths enter small openings and grooves, such, for example, as seams in fabricated metal articles, and are difficult to remove therefrom, and in heat treatment by use of air-filled heated chambers a sufficiently accurate control of the temperature is not always obtainable, and due to unequal distribution of heat within the chamber all parts of the object being heat treated, or objects disposed in different zones of the heat treating chamber, are subjected to different temperatures.

It is an object of the present invention to provide a heat treating furnace in which a very accurate control of temperature is obtained, in which the distribution of heat is very uniform.

In the following part of the specification the term "air" is used in reference to the heat conveying medium. It should be understood that this term comprehends the use of various suitable gases.

It is also an object of my invention to provide a heat treating furnace wherein the air is treated in a heat receiving zone within the furnace and moves as the result of convection to the heat transmitting zone of the furnace in which the articles to be heat treated are placed.

A further object of the invention is to provide a device of the above character having curtains of heat insulating material for substantially preventing the passage of heat from the heat producing elements of the furnace by radiation to the articles to be heat treated.

A further object of my invention is to provide a furnace in which the heat-treating chamber is heated principally by convection, and in which heated principally by convection, and in which small amounts of radiated heat are utilized for assisting in maintaining substantially equal temperatures in different parts of the heat-treating chamber of the furnace.

A further object of my invention is to provide a furnace in which the heat-treating chamber is principally heated by circulating preheated gas therethrough, and in which the temperature in the heat-treating chamber is controlled by controlling the temperature of the circulated gas and by radiated heat applied to different parts of the heat-treating chamber.

It is a still further object of my invention to provide a furnace of the character pointed out in which the temperature within the furnace is additionally controlled or moderated by the introduction of a cooling gas into the heat-treating chamber at certain parts or sections thereof as required by the temperatures existing therein.

In the furnace constituting the preferred form of my invention and which is to be described hereinafter, the heat-treating chamber is divided into sections and a separate heating means is applied for each section. It has been found in practice that when the heating means for a given section is de-energized or rendered non-operative, there is a tendency for the section to continue to rise in temperature due probably to the fact that the heating means for the section continues to give off heat.

It is accordingly an object of my invention to provide a furnace in which there is means which compensates for the heat supplied by the heating means after it has been de-energized to prevent an upward coasting of temperature.

It is a further object of the invention to provide a heat treating furnace in which the heat producing elements are arranged in sections within the furnace in such a manner that each section may have the heating thereof individually and separately controlled; wherein the heat producing means are of electrically energized type employing heating elements having associated switch mechanisms for the control of the same in a manner to maintain the temperature in the various sections of the heat treating furnace within very close limits; wherein thermocouples are employed in the sections of the furnace as heat responsive means for indicating the temperatures existing therein, together with a control unit with automatic means for progressively connecting the same to the successive thermocouples and the control switches for the electric heating elements which are associated therewith in the separate sections of the heat treating furnace.

It is a still further object of my invention to provide a heat treating furnace of the character pointed out in which the temperature throughout the entire space within which the articles are subjected to heat treatment is maintained very accurately at a predetermined point, and in which hot spots are prevented by circulating the air from one portion of this space to other portions thereof.

It is another object of my invention to provide a heat treating furnace of the character pointed out to provide means which prevent an upward coasting of temperature when the furnace has been heated to the desired maximum temperature and the heating element has been shut off.

The furnace incorporating the unique features and advantages outlined in the preceding objects and statements of invention is particularly designed to perform a novel method which I have invented. This method is very satisfactorily and efficiently performed in the furnace of my invention, yet it may be practiced in slightly different types of furnaces which are suitably designed or equipped for performing my method. I desire, therefore, to obtain patent protection not only on the apparatus but also on the method which I have developed.

It is accordingly an object of my invention to provide a method of heat treating objects which will heat the objects to a temperature which will not vary more than a few degrees.

It is another object of my invention to provide a method in which the objects are heated principally by heated air circulated into contact with the objects, which objects are preferably positioned in what I term a "heat-treating chamber" in order that efficient operation may be maintained.

It is a still further object of my invention to provide a method in which objects are heated by heated gas circulated into contact therewith, and in which the temperatures are controlled at certain times during the heat treating process by the introduction of a cooling air or cooling gas into the heat-treating chamber in which the objects are placed.

It is a still further object of my invention to provide a method of heat treating objects in which the objects are heated by convection and radiation, and in which the temperature is moderated by suitable introduction of a cooling gas.

Further objects and advantages of the invention will be made evident throughout the following part of the specification.

Referring to the drawings which are for illustrative purposes only.

The form of the invention disclosed in the drawings employs a chamber 10. Extending between side walls 11 and 12 are top and bottom walls 13 and 14, a rear end wall 15, and a front movable wall 16 forming a door for the opening 17 of the chamber 10. These walls which form the chamber 10 are of suitable heat insulating material, and the entire structure may be supported by the use of structural members 18 and 19.

Placed within the walls which form the chamber 10 are curtain walls or insulation walls 25. These walls 25 are positioned quite close to the side walls 11 and 12 and divide the chamber 10 into a heat-treating chamber 10A and two gas-heating chambers 10B. The curtain walls 25 stop short of the upper and lower boundaries of the chamber 10 so as to provide upper openings or passages 26 and lower openings or passages 27 connecting the chambers 10A and 10B.

Figure 1:
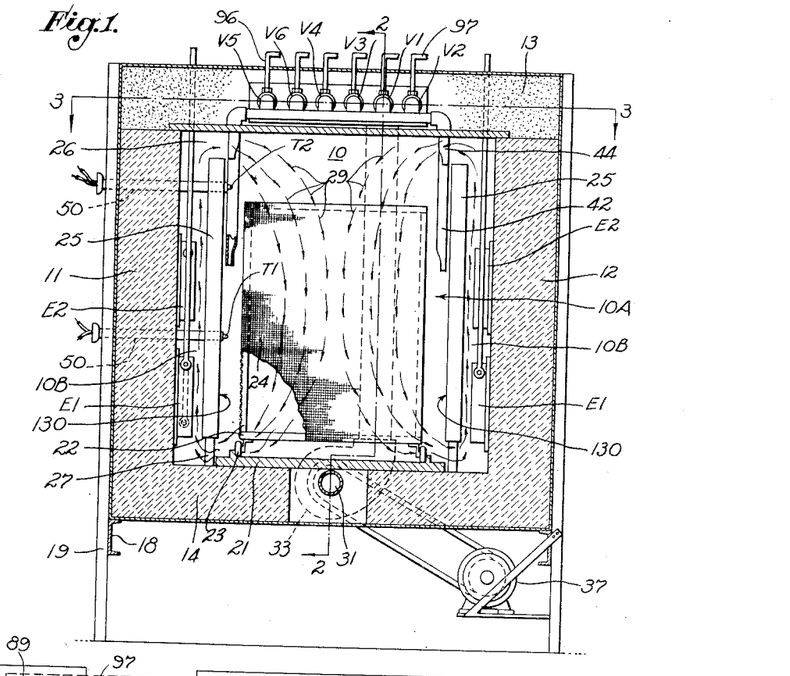
Fig. 1 is a cross-sectional view of a preferred form of the invention, this cross-section being taken substantially as indicated by the line 1—1 of Fig. 2, a portion of the insulation of the upper wall of the apparatus being broken away to show the valve and conduit construction.
Figure 2:
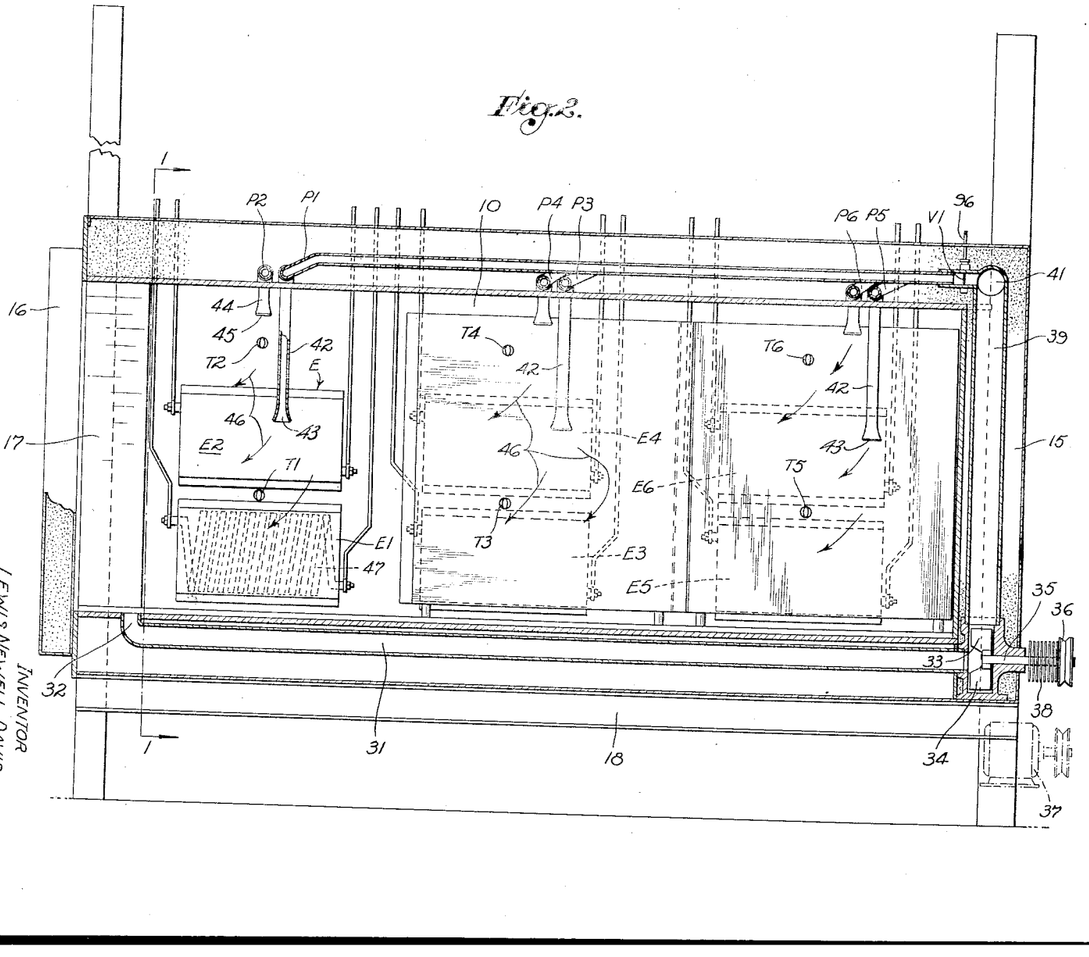
Fig. 2 is a longitudinal section taken as indicated by the line 2—2 of Fig. 1.

Within the gas-heating chambers 10B heat producing means are placed, these heat producing means consisting of heating elements generally indicated as E and specifically indicated as E1, E2, E3, E4, E5, and E6. There are two of each of these elements E, forming pairs, each pair of elements constituting a section which is individually or separately controlled and occupies its individual section within the gas-heating chambers 10B and the heating chamber 10. As shown in Fig. 2, one each of the elements E1, E2, E3, E4, E5, and E6 is placed on the left-hand side wall 11 of the chamber 10, and the remaining elements E1, E2, E3, E4, E5, and E6 are placed on the right-hand wall 12 of the chamber 10. The general arrangement of the heating elements E is shown in Fig. 1 and Fig. 2 wherein the pair of heating elements E1 and the pair of heating elements E2 are shown in opposing relation on the side walls 11 and 12 of the heating chamber 10.

On a suitable track means 21, supported adjacent the bottom 14 of the chamber 10, a carriage or carriages 22 are supported by means of wheels 23 whereby they may be rolled in and out of the heating chamber 10. The carriages 22 carry loading racks 24 which occupy a central space within the chamber 10 between the side walls thereof. These loading racks are supported in elevated relation solely by the wheels 23 so that conduction of heat from the racks to the articles to be heat treated is substantially eliminated owing to the fact that the loading racks 24 receive substantially no heat by conduction due to contact with the walls of the chamber 10.

The furnace and method of my invention have been particularly created for the heat treatment of relatively thin metal alloy parts, such for example as duralumin, which is used in the construction of airplanes. In order to properly heat treat this aluminum alloy it is quite necessary that the temperature within different parts of the heat-treating chamber be held within close temperature limits in order that all portions of a given object or different objects placed in different parts of the heat-treating chamber be heat treated to the same and to the desired extent. In my invention this desired result has been accomplished by heating the heat treating furnace principally by convection and by supplying necessary additional heat by radiation. As shown in Fig. 1, the heating elements E1 to E6 inclusive are placed in the gas-heating chambers 10B and when these heating elements have been energized heat is applied to the air or gas within the chambers 10B and it is caused to flow upward, and when this occurs cooler air will move in an upward direction and be heated. In this way a continuous closed circuit circulation, as indicated by the arrows 29, is set up. In the larger size of furnace as illustrated in Figs. 1 to 5 inclusive there are two separate circuits through which the hot gas flows, one from each side of the heat treating chamber 10A as illustrated. It will be seen that the heated gas flows upwardly through the gas-heating chamber 10B, inwardly through the passages 26, downwardly through the heat-treating chamber 10A, outwardly through the passages 27, and into the lower ends of the gas-heating chambers 10B, thus completing the circulation of the hot gas through a closed circuit. Whenever a given heating element is energized heat is applied to the adjacent portion of the adjacent curtain wall 25, and although the curtain wall 25 is made from a heat insulation material, such for example as Firecrete, a small amount of heat is transmitted through the curtain wall and into the adjacent part of the heat-treating chamber 10A. This action occurs adjacent each of the twelve heating elements whenever any of the heating elements is energized. It will therefore be seen that in addition to the temperature derived from the hot gas circulated through the heat-treating chamber 10A there is at certain points and at certain times additional heat applied due to radiation, as will be pointed out hereinafter when a complete description of the operation of the furnace is given. This radiated heat is quite valuable in assisting in maintaining an even temperature throughout the entire heat-treating chamber 10A.

Figure 3:
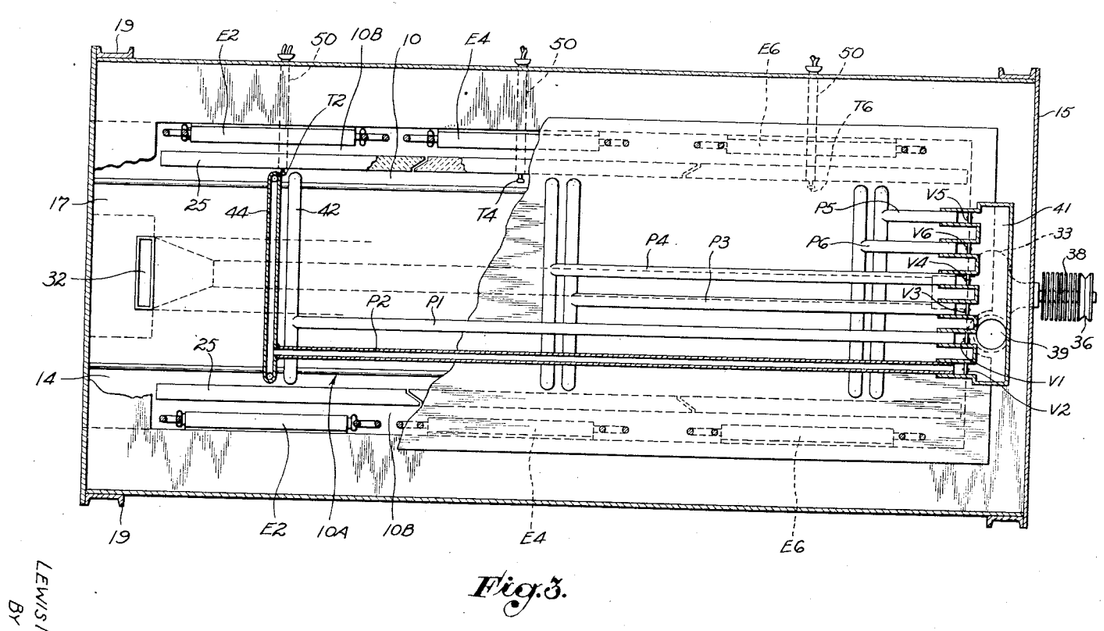
Fig. 3 is a longitudinal sectional view taken substantially as indicated by the line 3—3 of Fig. 1.

To produce an even distribution of the heat within the chamber the invention provides a means for taking air from one part of the chamber and returning it to other parts of the chamber. With reference to Fig. 2, a duct 31 is shown with its inlet end 32 connected to that part of the chamber deemed to have the lowest temperature during the normal operation of the heat treating furnace. This specified portion of the chamber is the lower part of the forward end of the chamber adjacent the door 16. The duct 31 is connected to a blower or fan 33 having an impeller 34 mounted on a shaft 35 carrying a pulley 36 adapted to be driven by a belt from a motor 37. So that a high temperature will not be carried to the belt, which is not shown, radiation fins 38 are mounted on the outer portion of the shaft 35. The blower 33 discharges into a vertical pipe 39 which extends upwardly within the rear wall 15 to a laterally extending header 41. As shown in Figs. 2 and 3, six delivery pipes P1, P2, P3, P4, P5, and P6 extend forwardly in the upper wall 13 of the chamber 10, these air distribution pipes, generally designated by P, having the function of distributing air which has been taken from the chamber 10 through the inlet end 32 of the duct 31 to the six sections of the chamber 10 containing or established by the pairs of heat producers or heating elements E. Each of the circulation pipes P1, P3, and P5 includes branch pipes 42 which drop on opposite sides of the chamber 10 and across the inner faces of the curtain walls 25 to a plane substantially intermediate the height of the chamber 10 so that the outlet ends 43 of the branch pipes 42 will deliver air downwardly and laterally into the three lower sections of the chamber 10 lying between each pair of heating elements E1, E3, and E5. The air circulation pipes P2, P4, and P6 have branch pipes 44 forming the ends thereof, these branch pipes extending downwardly at the sides of the chamber 10 and a short distance across the upper portions of the curtain walls 25, so that the outlets 45 thereof will discharge air into the chamber 10 lying the three upper sections in the chamber 10 lying between each pair of upper heating elements E2, E4, and E6.

The withdrawing of air from one part of the chamber 10 and returning the same to other parts of the chamber 10 produces an air circulation within the heating chamber supplementary to the circulation of heated air indicated by the arrows 29 of Fig. 1. As shown in Fig. 2, there is also a longitudinal circulation toward the leftward or front end of the heating chamber and an intermixing effect as indicated by the arrows 46. The circulation of air above described is for the purpose of producing an even distribution of heat through the central portion of the heat-treating chamber by the elimination of dead spots in the circulation, and this circulation of air has a further important purpose in minimizing the upward "coasting" of the temperature in the heat-treating chamber 10A.

Figure 4:
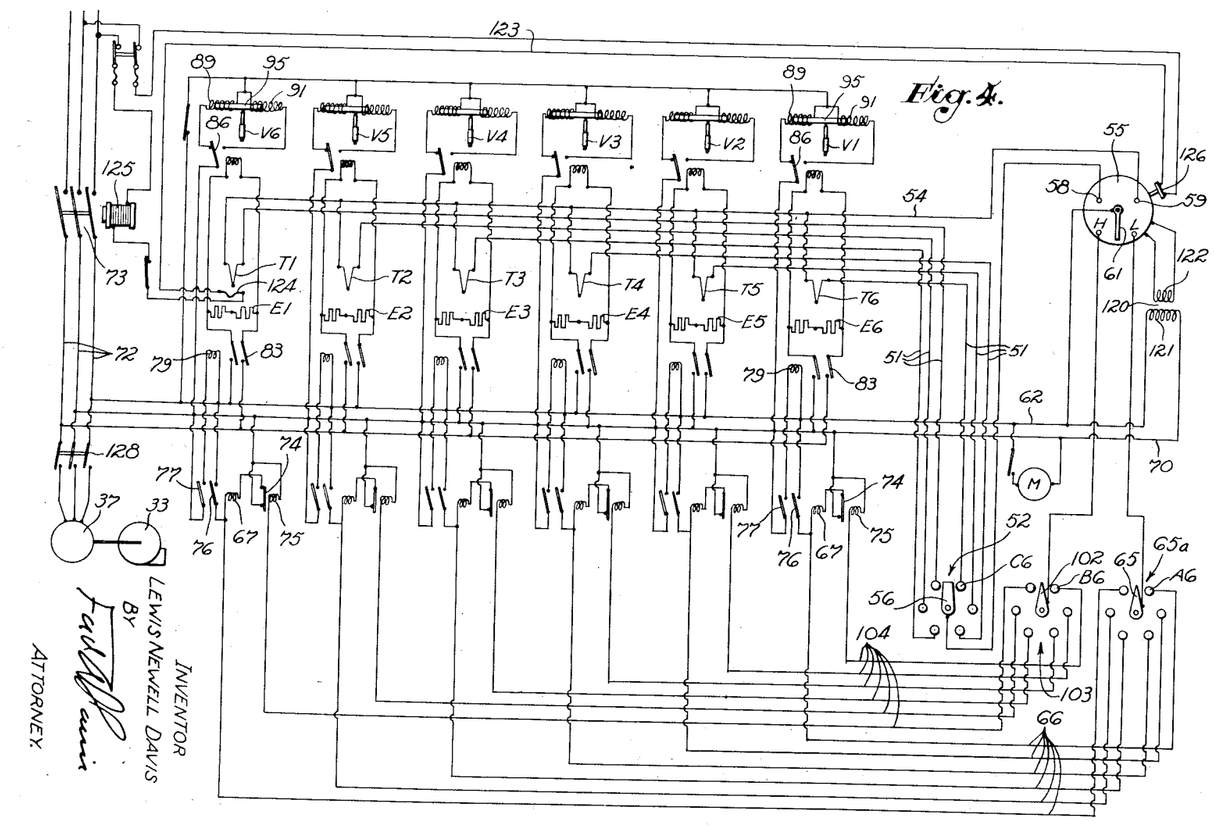
Fig. 4 is a complete wiring diagram for the invention.
Figure 5:
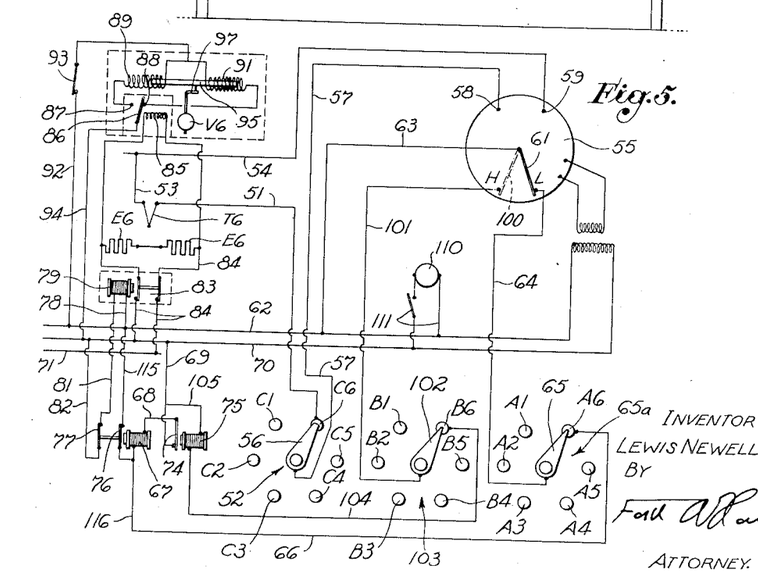
Fig. 5 is a wiring diagram showing one section of the electrical controlling system connected with the main control unit of the invention.

Each of the heating elements E includes a resistor 47 wound to spiral form and from each end of each resistor 47 a conductor bar vertically extends to the exterior of the chamber 10, these conductor bars being included in the electrical circuits shown in the electrical diagrams, Figs. 4 and 5.

Associated with each section of the chamber, and likewise with each section of the heating elements, is a thermocouple T. Since there are six of these thermocouples, they are separately indicated as T1, T2, T3, T4, T5, and T6. These thermocouples are of the standard commercial type and include tubular casings 50 which project through a wall of the chamber 10, as shown in Figs. 1 and 3. These thermocouples accordingly constitute heat-responsive members which generate the electrical energy in proportion to the temperature to which they are subjected, and accordingly each thermocouple constitutes a means for checking the temperature in a separate section of the chamber 10.

In the wiring diagram, Fig. 5, which is supplementary to the wiring diagram, Fig. 4, I show the manner in which a thermocouple T6 is employed in conjunction with other control mechanisms for the accurate control of the temperature in the heat-treating chamber 10A. From one side of the thermocouple T6, a conductor 51 is carried to a stationary contact C6 of a distributor 52 having five other stationary contacts C1, C2, C3, C4, and C5 arranged in a circle with the contact C6. The other side of the thermocouple T6 is connected through a wire 53 with a buss wire 54 extending to a main control unit which is of an electrically responsive and operative type. A rotary brush 56 forming a part of the distributor 52 is connected through a conductor 57 with a terminal 58 which is complementary to the terminal 59 to which the buss wire 54 connects. As described, the thermocouple T6 is connected through conductors and through the distributor 52 with an electro-responsive part of the main control unit 55. The main control unit is a standard electrical instrument which cooperates with the thermocouple T6 in forming what is known as a potentiometer pyrometer having a galvanometer which operates in response to the electrical energy produced by the thermocouple T6 to control electrical mechanisms which need not be shown, such electrical mechanisms moving a switch contact 61 to the left or to the right in accordance with the rise and fall of the temperature to which the thermocouple T6 is subjected.

When the movable contact 61 engages the low temperature contact L, it connects a conductor 62 through a wire 63, the contact 61, the contact L, a conductor 64, a rotary switch brush 65 of a distributor 65a, a contact A6, and a conductor 66 with an electromagnet 67 which is in turn connected to conductors 68 and 69 with a main conductor 70 which cooperates with the conductor 62 and an additional main conductor 71 to form a three-wire three-phase electrical distribution system which may be connected to the three wires 72 of Fig. 4, which are brought into the building through a main switch 73, from a commercial electrical supply system or from any suitable source of three-phase electrical current. As will be noted in Fig. 5, a switch 74 is interposed between the conductors 68 and 69, this switch being normally closed unless opened as a result of the energizing of an electromagnet 75, as will be hereinafter explained.

As shown in Fig. 5, the energization of the electromagnet 67 results in the closing of a holding relay 76 and a control relay 77. The closing of the control relay 77 closes a circuit consisting of a conductor 78, an electromagnet 79, a conductor 81, and a conductor 82, with the result that a control switch 83 is closed by the electromagnet 79; thereby closing a circuit 84 which connects the heating elements E6 with two wires 70 and 71 of the three-phase supply system, and resulting in the generation of heat within a section of the heat-treating chamber 10. The circuit 84 also extends to and includes an electromagnet 85 of an air control switch 86 which engages a contact 87 when the electromagnet 85 is de-energized, and is drawn into engagement with a contact 88 when the electromagnet 85 is energized as the result of the closing of the switch 83. The contacts 87 and 88 are respectively connected with solenoid windings 89 and 91 which are in turn connected through a wire 92 and switch 93 with the conductor 62. The switch 86 is connected by a wire 94 with the conductor 70. The solenoid coils 89 and 91 are adapted to move a core or armature 95 which is connected to a butterfly valve V6, forming a part of a group of valves generally indicated by V and being individually indicated as V1 to V6 inclusive, and being disposed in the forward ends of the air distributing pipes P1 to P6 for control of the circulation of air therein. As shown in Fig. 2, each valve V has a supporting stem or shaft 96 with a handle 97 formed thereon, each handle 97 being connected to a solenoid 95 as indicated in Fig. 5.

When the switches 77, 83, and 86 are in the positions in which they are shown in Fig. 5, the solenoid winding 91 will be energized and the valve V6 will be in a closed or flow-restricting position, as shown in Fig. 3. When, however, the movable switch 61 of the main control unit 55 moves into engagement with the contact H and the electro-magnet 85 is de-energized as a result thereof, the switch 86 will be moved into engagement with the contact 87 and the solenoid winding 89 will be energized, moving the armature 95 so as to rotate the valve V6 into an open position. Accordingly, during the time the heating elements E6 are energized and are giving off heat so as to raise the temperature in the corresponding section of the chamber 10, the flow through the outlets 45 of the air circulation pipes P6 will be of reduced quantity or completely shut off as desired, depending upon whether or not the valves are arranged to completely or only partially close the pipes when in a restricting position.

When the delivery of heat into the chamber 10 produces a sufficiently high temperature in the thermocouple to cause the movable switch member 61 of the main control unit 55 to move into engagement with the contact H, as indicated by dotted lines 100 in Fig. 5, current will flow through a conductor 101 to a rotary switch member or brush 102 forming a part of a distributor 103 having a plurality of contacts generally indicated as B and specifically indicated as B1 to B6 inclusive. The rotary switch element 102 engages the stationary contact B6 and is connected through a conductor 104 with the electromagnet 75 which is in turn connected through a wire 105 with the conductor 69. The energization of the electromagnet 75 opens the switch 74 and accordingly interrupts the flow of current through the electromagnet 67, allowing the switches 76 and 77 to open.

The opening of the switch 77 de-energizes the electromagnet 79 resulting in the opening of the switch 83 which in turn de-energizes the heating elements E6 and the electromagnet 85. De-energization of the electromagnet 85 permits the switch 86 to return to engagement with the contact 87 so that the solenoid winding 89 will be energized, moving the armature 95 so as to swing the valve V6 into fully open position such as shown in Fig. 4, thereby permitting a maximum flow of air to be circulated through the air circulation pipe P6.

As herein mentioned, the use of the air circulation has a function of reducing "coasting" of the temperature. Prior to the opening of the switch 83 the heating elements E6 are heated to a maximum temperature, and being of metal have heat stored therein which continues to pass into the chamber 10 after the opening of the switch 83, and accordingly tends to raise the temperature above the value at which the control means is set to open the switch 83. In the invention a circulation of air is increased at the time the switch 83 is open. This increased delivery of air into the section of the chamber identified by the heating elements E6, which have just been shut off, has the purpose of offsetting the tendency of the temperature to increase greatly above the prescribed value due to the giving off of stored heat from the elements E6, the chamber walls, and the curtain walls 25, after the switch 83 has been opened.

A motor 110 is connected through a circuit 111 with the conductors 62 and 70. This motor is connected to the distributors 52, 103, and 65a, so as to rotate the brushes or rotary contacts 56, 102, and 65 thereof in synchronism so that they will successively engage their respective contacts C1 to C6 inclusive, B1 to B6 inclusive, and A1 to A6 inclusive. As shown in Fig. 4, in which the parts are shown in neutral positions, each thermocouple T is connected to the buss wire 54 extending to the contact 59 of the main control unit 55 and each thermocouple T is likewise connected to its corresponding contact C of the distributor 52 by means of additional conductors 51. Each of the pairs of heating elements E has a duplicate of control means shown in Fig. 5; that is, each pair of heating elements E1, E2, E3, E4, E5, and E6 has a circuit opening switch 74 equipped with an electromagnet 75 and relay switches 76 and 77 actuated by an electromagnet 67, together with the various switches 83 and 86 previously described in Fig. 5. Each circuit opening electromagnet 75 associated with each of the pairs of heating elements E1 to E6 inclusive is connected through a wire 104 with a corresponding contact B1 to B6 inclusive of the distributor 103. Also the relay electromagnet 67 associated with each of the pairs of heating elements E1 to E6 is connected through a wire 66 with a corresponding contact A1 to A6 of the distributor 65a. Accordingly, as the contacts 56, 102 and 65 rotate counterclockwise in synchrony, the main control unit will be progressively connected to each successive section of the electrical equipment, and the thermocouple T of said section will deliver electrical energy to the main control unit 55 to cause a proper movement of the switch part 61 to the right or to the left, with the result that the heating element E of the pair connected to the main control unit 55 will be turned on or off as required by the existing temperature in the section, and the valve controlling switch 86 will be likewise actuated as described relative to Fig. 5.

The hold-in switch 76 connects a conductor 115 with a conductor 116, as shown in Fig. 5, so that after the switches 76 and 77 are closed, further energization of the electromagnet 67 through the wire 66 and its associated contact A will not be required. Therefore, the heating equipment of each section may continue in "turned-on" position after the distributors have connected the main control unit 55 to a succeeding section or sections.

The distributors 56, 102 and 65a are preferably driven at a speed of two revolutions per minute with the result that each of six sections of the heating equipment of the heat treating furnace is connected to the main control unit twice during each minute, or at intervals of one-half minute. This assures a complete and practical automatic supervision of the sections of the furnace, with the final result that the temperature in all sections of the furnace is kept within a very small range of difference relative to a prescribed temperature for which the main control unit 55 is set. With the control equipment hereinbefore described, it has been found that the temperatures within the chamber 10 are maintained to approximately five degrees, plus or minus, of the temperature setting of the main control or pyrometer unit 55.

In Fig. 4 a transformer 120 is shown having its primary 121 connected to the main circuit conductors 62 and 70, and having its secondary 122 connected with the main control unit 55 to operate the power means ordinarily employed in potentiometer devices of this character.

As a safety measure, a safety circuit 123 is provided, this safety circuit including a fuse 124, an electromagnet 125 which holds the main switch 73 closed, and a switch 126 associated with the main control unit 55, which switch 126 is automatically opened in the event of failure of a thermocouple circuit. Should the temperature within the furnace rise to a value above the melting point of the fuse 124, or should a thermocouple circuit fail, the safety circuit 123 will be opened, de-energizing the magnet 125 and causing the opening of the switch 73, thereby shutting down the entire system. Also in Fig. 4 the motor 37 for the blower 33 is shown connected to the conductors 72 through a switch 128.

In the performance of the method of my invention and in the operation of the heat treating furnace which I have described, when it is desired to utilize the furnace the doors are closed and the apparatus set into operation in order to bring the heat-treating chamber 10A up to the desired temperature. Various apparatus illustrated in Figs. 4 and 5 is suitably adjusted so that the parts will operate as previously described to maintain the temperature as desired. When the furnace is cold all of the heating elements E1 to E6 will be energized with the result that the circulation of heated gas will be set up as indicated by the arrows 29 in Fig. 1, and in addition heat will be radiated through the curtain walls 25 at points adjacent the different elements E1 to E6 inclusive, as previously pointed out. Most of the heat for heating the heat-treating chamber is supplied by convection; that is, by the circulation of hot gases through the heat-treating chamber 10A. A small amount of heat, however, is supplied by radiation and the manner in which the radiated heat assists in controlling the temperature will now be pointed out by reference to an operation of the furnace in which the temperature within the heat-treating chamber was maintained in actual practice at a temperature of 922° F., plus or minus two degrees.

When the furnace has been set to maintain this temperature the control unit 55 will engage the L contact when the temperature of the thermocouple T1 or T6 is at 918° F. and will engage the H contact when the temperature of any one of these thermocouples is 922° F. Assuming now for the purpose of illustration that the furnace has been set into operation when cool, as previously described, and that the temperature within the heat-treating chamber 10A has now approached 922° F., plus or minus, referring particularly to Figs. 1 and 2, and assuming that the heating element E1 is at this time energized, in addition to hot gas being circulated through the section of the furnace opposite the heater E1, this section is also being heated by heat radiated through the curtain walls 25 adjacent the heating element E1. From actual test it has been determined that the temperature on the inner surface of the curtain walls 25 at points adjacent the heating elements E1 as indicated at points 130, ranges between 922° F. to 925° F. when the temperature at the thermocouple T1 ranges from 918° F. to 922° F. When the section of the heat-treating chamber 10A controlled by the heating elements E1 has been raised so that the temperature at the thermocouple T1 is 922° F., and when the parts of the control apparatus are in positions to connect the parts of the apparatus in operative relationship to the heating elements E1 and the thermocouple T1, the apparatus will be energized so that the heating elements E1 are de-energized. In other words, the parts are moved from the relative positions as illustrated in Fig. 5 into such positions that the various switches 76, 77, and 83 are opened and so that the contact 86 is in engagement with the contact 87. At this time the coil 89 is energized and the valve V1 is moved from a closed position into an open position so that cooling gas is supplied through the pipes or ducts 42 associated with the section of the furnace controlled by the heating elements E1. As explained heretofore, this cooling gas is withdrawn from the lower forward part of the heat-treating chamber 10A, which is probably the coolest point in the furnace, and it has been found from actual test that the cooling gas introduced through the pipes 43 ranges between a temperature of 913° F. to 917° F. The introduction of this cooling gas is effective in cooling the hot gas which passes downwardly into the section of the furnace under discussion and effectively prevents the temperature from "coasting" upward. It appears that this cooling gas compensates for the heat which has been stored up in the heating elements E1 and in the adjacent parts of the curtain walls 25. When the temperature in this section drops so that the temperature at the thermocouple T1 is 918° F., the apparatus is then operated so that all of the parts move into the positions illustrated in Fig. 5 and the heating elements E1 are energized, and the flow of cooling gas is either completely shut off or shut off to a substantial extent according to the particular adjustment of the valve V1.

The temperature in any upper section of the furnace, such as is controlled by the heating elements E2, is substantially the same as described with relation to the lower section controlled by the heating elements E1. It has been found in actual practice that when any upper heating element or pairs of heating elements are energized, the temperature immediately above it is approximately 950° F. while the temperature is reduced to 928° F. when the adjacent heating element is de-energized. In the operation of the heat treating furnace as just described it is possible to control the temperature within close limits, such for example as 922° F., plus or minus two degrees. The temperature in the upper part of the chamber is at times slightly hotter than the temperature in the lower part of the chamber, but during actual tests it has been found that this temperature does not vary more than 3°, with the result that parts placed in any portion of the heat-treating chamber 10A are subjected to substantially the same temperature so far as practical results are concerned.

Figure 6:
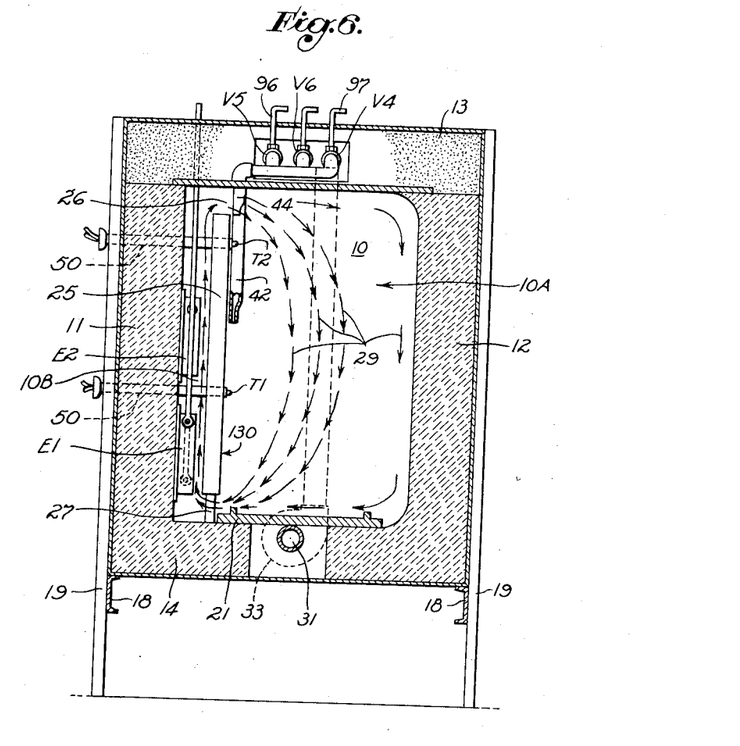
Fig. 6 is a cross-sectional view through an alternative form of furnace of my invention and which illustrates a design particularly adapted for smaller sizes of furnaces.

In Fig. 6 I have shown an alternative form of my invention designed for use in smaller furnaces. This form of my invention utilizes a curtain wall on but one side of the chamber 10 and in place of having the parts, such as the heating elements E, the pipes 42 and 44, etc. in duplicate, they are provided only at one side of the furnace. There is, therefore, but one circulating path of hot gas for heating the heat-treating chamber 10A and there is radiated heat applied from but one side of the heat-treating chamber 10A. In Fig. 6 the parts are numbered to correspond to identical parts of the form of my invention illustrated in Figs. 1 to 5 inclusive, and the construction and operation may be readily understood from the foregoing description when it is taken into consideration that the parts mentioned heretofore are not provided in duplicate.

My invention of electric furnace resides in the novel combination of elements defined heretofore and resides in a new principle of operation performed by such novel combination of parts.

I therefore do not wish my invention to be limited to the details of construction nor to the particular combination which comprises the preferred form of my invention. My invention likewise resides in the novel method described heretofore which may be practiced either in the two furnaces which I have illustrated or in other alternative constructions designed for practicing the method. For these reasons I desire my invention to be broadly construed in accordance with the spirit and scope of the appended claims.

I claim as my invention:

1. A heat treating furnace of the character described, including: walls forming a heat treating chamber and forming a gas heating chamber connected to said heat treating chamber at the upper and lower parts thereof; heating means in said gas heating chamber whereby the gas is heated, said heated gas flowing from said gas heating chamber into the upper end of said heat treating chamber, downwardly therethrough and into said gas heating chamber; and gas circulating means for withdrawing gas from one part of said heat treating chamber and delivering it to other hotter parts thereof.

2. A heat treating furnace of the character described, including: walls forming a heat treating chamber; hot-gas circulating means for circulating heated gas through said heat treating chamber for heating same; and cooling gas circulating means for withdrawing gas from one part of said heat treating chamber and delivering it to said heat treating chamber where the temperature has risen above a predetermined degree.

3. A heat treating furnace of the character described, including: walls forming a chamber; a heating element disposed adjacent one wall of said chamber within said chamber; a curtain wall disposed between said heating element and the central space of said chamber, there being openings at the lower and upper edges of said curtain wall for the circulation of air upwardly along the side of said curtain wall facing said heating element and downwardly on the opposite side of said curtain wall; and conduit means for circulating air from the lower portion of said chamber to the upper portion thereof.

4. A heat treating furnace of the character described, including: walls forming a chamber; heat producing means in said chamber disposed adjacent opposing walls of the chamber; curtain walls of heat obstructing material disposed relatively close to said last-named walls of said chamber and between said heat producing means and the central space of said chamber, there being openings at the lower and upper edges of said curtain walls through which air may circulate upwardly across the faces of said curtain walls facing said heat producing means and downwardly within the central space of said chamber; and means comprising a pump and a plurality of conduit members for circulating air from a cooler part of said chamber to a plurality of other hotter parts of said chamber.

5. A heat treating furnace of the character described, including: walls forming a chamber; a heating element disposed adjacent one wall of said chamber within said chamber; a curtain wall disposed between said heating element and the central space of said chamber, there being openings at the lower and upper edges of said curtain wall for the circulation of air upwardly along the side of said curtain wall facing said heating element and downwardly on the opposite side of said curtain wall; and means comprising a pump and a plurality of conduits extending outside said chamber for circulating air from the lower part of said chamber to a plurality of points in said chamber above the bottom thereof.

6. A heat treating furnace of the character described, including: walls forming a heat treating chamber and forming a gas heating chamber connected to said heat treating chamber at the upper and lower parts thereof; heating means in said gas heating chamber whereby the gas is heated, said heated gas flowing from said gas heating chamber into the upper end of said heat treating chamber, downwardly therethrough and into said gas heating chamber; and gas delivery means for recirculating gas from a cooler part of said heat treating chamber and introducing it at locations where the temperature tends to increase above a desired degree.

7. A heat treating furnace of the character described, including: walls forming a heat treating chamber; a plurality of heating means whereby different sections of said heat treating chamber may be heated; control means for controlling the operation of said heating means in accordance with the temperatures in the sections of said heat treating chamber; and means for introducing cooling gas into a section of said heat treating chamber when the heating means associated therewith has been made non-operative by said control means.

8. In a method of heat treating work, the steps of: placing the work to be heat treated in a heat treating chamber; circulating hot gas in a closed circuit through a gas heating means and through said heat treating chamber; and withdrawing gas from one part of said heat treating chamber and introducing it at another hotter part thereof.

9. A heat treating furnace of the character described, including: walls forming a chamber; a plurality of heat producers supplying heat to different parts of said chamber; a plurality of heat responsive elements in said chamber, one each being associated with each of said heat producers; a plurality of air circulating conduits, each of which is placed so as to take air from the interior of said chamber and to deliver the same to a separate section of said chamber; a plurality of heat controlling members, one each of which is operatively connected to one of said heat producers for control of the same; a main control unit adapted for connection separately to each one of said heat responsive elements and acting in accordance with the temperature of the same to adjust the heat producer associated therewith; means for connecting said main control unit individually to each of said heat responsive elements and its associated heat producer; flow control valves for said conduits; and means connected with said control means of said heat producers for automatically opening and closing said valves.

10. A heat treating furnace of the character described, including: walls forming a chamber; a plurality of heat producers disposed in adjacent sections of said chamber so as to deliver heat into said sections; a plurality of heat responsive elements in said chamber, one each being associated with each of said heat producers; a plurality of heat controlling members, one each of which is operatively connected to one of said heat producers for control of the same; a main control unit adapted for connection separately to each one of said heat responsive elements and acting in accordance with the temperature of the same to adjust the heat producer associated therewith; means operating automatically to connect said main control unit individually to each of said heat responsive elements and its associated heat producer; a plurality of conduits each of which is so placed as to draw air from an end of said chamber and deliver the same to a section of said chamber; and flow producing and controlling means for said conduits connected with said control members of said heat producers, said last-named means being so connected to and controlled by said main control unit that the flow through said conduits will be maximum when the interior of said furnace is at maximum temperature.

11. A heat treating furnace of the character described, including: walls forming a chamber; a plurality of heating elements arranged in separate sections in the interior of said chamber; control switches, each of which is connected to a separate section of said heating elements and is adapted to connect the same to an electric current supply; a plurality of thermocouples, each of which is placed in said chamber in association with one of the sections of said heating elements; a main control unit adapted to be separately connected to each of said thermocouples and its associated control switch, said main control unit having electrical means acting in response to the electric energy received from said thermocouples to actuate said control switches; means for connecting said main control means separately to each of said thermocouples and its associated control switch; air circulating means for said chamber comprising a plurality of conduits each connected so as to draw air from the lower part of one end of said chamber and to deliver the same to a separate section of said chamber; electrically controlled valve means for said conduits; and means connecting said valve means with said main control unit and operating to cause the opening and closing of said valve means in accordance with prescribed temperature conditions in said chamber 12. A heat treating furnace of the character described, including: walls forming a chamber; a plurality of heating elements arranged in separate sections in the interior of said chamber adjacent a wall thereof; a curtain wall between said heating elements and the heat treating space of the chamber; control switches, each of which is connected to a separate section of said heating elements and is adapted to connect the same to an electric current supply; a plurality of thermocouples, each of which is placed in said chamber in association with one of the sections of said heating elements; a main control unit adapted to be separately connected to each of said thermocouples and its associated control switch, said main control unit having electrical means acting in response to the electric energy received from said thermocouples to actuate said control switches; means for connecting said main control means separately to each of said thermocouples and its associated control switch; air circulating means for said chamber comprising a plurality of conduits each connected so as to draw air from the lower part of one end of said chamber and to deliver the same to a separate section of said chamber adjacent the face of said curtain wall presented toward said heat treating space of said chamber; electrically controlled valve means for said conduits; and means connecting said valve means with said main control unit and operating to cause the opening and closing of said valve means in accordance with prescribed temperature conditions in said chamber.

13. In a method of heat treating work, the steps of: placing the work to be heat treated in a heat treating chamber; circulating hot gas through said heat treating chamber; and withdrawing gas from a cooler part of said heat treating chamber and introducing it into said heat treating chamber where the temperature has risen above a predetermined degree.

14. In a method of heat treating work, the steps of: placing the work to be heat treated in a heat treating chamber; circulating hot gas in two separate closed circuits upwardly through a gas heating means from opposite sides of said heat treating chamber and downwardly through said heat treating chamber; and withdrawing gas from one part of said heat treating chamber and introducing it at another hotter part thereof.

15. In a method of heat treating work, the steps of: placing the work to be heat treated in a heat treating chamber; circulating hot gas in two separate closed circuits through a gas heating means from opposite sides of said heat treating chamber and through said heat treating chamber; and withdrawing gas from a cooler part of said heat treating chamber and introducing it at a hotter part thereof.

16. A heat treating furnace of the character described, including: walls forming a heat treating chamber and forming a gas heating chamber connected to said heat treating chamber at the upper and lower parts thereof; heating means in said gas heating chamber whereby the gas is heated, said heated gas flowing from said gas heating chamber into the upper end of said heat treating chamber downwardly therethrough and into said gas heating chamber; gas circulating means for withdrawing gas from one part of said heat treating chamber and delivering it to other parts thereof; and control means for controlling the operation of said gas circulating means whereby gas is delivered to said heat treating chamber where the temperature has risen above a predetermined degree.

17. A heat treating furnace of the character described, including: walls forming a heat treating chamber; hot gas circulating means for circulating heated gas through said heat treating chamber for heating same; cooling gas circulating means for withdrawing gas from one part of said heat treating chamber and delivering it to other parts thereof; and control means for controlling the operation of said gas circulating means whereby gas is delivered to said heat treating chamber where the temperature has risen above a predetermined degree.

18. In a method of heat treating work, the steps of: placing the work to be heat treated in a heat treating chamber; circulating hot gas through said heat treating chamber; and withdrawing gas from one part of said heat treating chamber and introducing same at locations in said heat treating chamber where the temperature has risen above a predetermined degree.

19. In a method of heat treating work, the steps of: placing the work to be heat treated in a heat treating chamber; circulating heating gas through said heat treating chamber; heating said heating gas by a plurality of heating means so that different heating means heat said heating gas which is circulated through different sections of said heat treating chamber; de-energizing a heating means for a given section when said section rises in temperature above a predetermined degree; and also introducing cooling gas into said last-named section when the heating means asociated therewith is de-energized.

20. In a heat treating furnace of the class described, the combination of: walls forming a chamber; a curtain wall in said chamber, forming same into a heat treating chamber adapted to receive work, a heating chamber, and upper and lower passages connecting said heat treating and said heating chambers together; heating means in said heating chamber whereby gas is heated and caused to flow by convection in a closed circuit through said heating chamber, said upper passage, said heat treating chamber, and said lower passage; and gas circulating means for withdrawing gas from one part of said heat treating chamber and introduced it into said heat treating chamber at one or more places at which the temperature has risen above a predetermined degree.

LEWIS NEWELL DAVIS.